United States Patent
Meadow et al.

(10) Patent No.: US 8,090,633 B2
(45) Date of Patent: Jan. 3, 2012

(54) METHOD AND APPARATUS FOR IMAGE DATA BASED VALUATION

(76) Inventors: William D. Meadow, Jacksonville, FL (US); Matthew Pavelle, Jacksonville, FL (US)

(*) Notice: Subject to any disclaimer, the term of this patent is extended or adjusted under 35 U.S.C. 154(b) by 171 days.

(21) Appl. No.: 12/344,021

(22) Filed: Dec. 24, 2008

(65) Prior Publication Data

US 2009/0171822 A1   Jul. 2, 2009

Related U.S. Application Data

(60) Provisional application No. 61/009,151, filed on Dec. 24, 2007, provisional application No. 61/009,181, filed on Dec. 24, 2007, provisional application No. 61/009,147, filed on Dec. 24, 2007.

(51) Int. Cl.
*G07B 17/00* (2006.01)

(52) U.S. Cl. .............. 705/30; 705/38; 705/39; 705/40

(58) Field of Classification Search .............. 705/30, 705/38, 39, 40
See application file for complete search history.

(56) References Cited

U.S. PATENT DOCUMENTS

| | | | | |
|---|---|---|---|---|
| 6,366,892 B1* | 4/2002 | Altman et al. | ................... | 705/38 |
| 7,698,212 B1* | 4/2010 | Peirson et al. | ................... | 705/38 |
| 7,747,526 B1* | 6/2010 | Palumbo et al. | ................. | 705/40 |
| 2004/0143543 A1* | 7/2004 | Goldman | ........................ | 705/38 |
| 2006/0059073 A1* | 3/2006 | Walzak | ............................ | 705/35 |
| 2006/0155570 A1* | 7/2006 | Almeida et al. | .................. | 705/1 |
| 2006/0155594 A1* | 7/2006 | Almeida et al. | .................. | 705/7 |
| 2008/0120215 A1* | 5/2008 | Wagner | ............................ | 705/35 |

* cited by examiner

*Primary Examiner* — Vanel Frenel
(74) *Attorney, Agent, or Firm* — Joseph P. Kincart (57) ABSTRACT

The present invention teaches methods and apparatus for capturing image of a subject property and utilizing the captured image data to determine a value of the subject property. In some embodiments, one or more of VideoDriveBy and VideoWalkABout are included in the captured image data. The captured image data can support a valuation of loan collateral.

14 Claims, 6 Drawing Sheets

METHOD AND APPARATUS FOR IMAGE DATA BASED VALUATION

CROSS REFERENCE TO RELATED APPLICATIONS

The present application claims priority to pending patent application Ser. No. 12/135,170, filed, Jun. 6, 2008 and entitled, "Apparatus and Method for Producing Video Drive-By Data Corresponding to a Geographic Location," the contents of which are relied upon and incorporated by reference, and also Provisional Patent Application Ser. No. 61/009,151 and entitled "Methods and Apparatus for Image Based Valuation" filed Dec. 24, 2007, the contents of which are relied upon and incorporated by reference, and also Provisional Patent Application Ser. No. 61/009,181 and entitled "Methods and Apparatus for Real Estate Image Capture" filed Dec. 24, 2007, the contents of which are relied upon and incorporated by reference and also Provisional Patent Application Ser. No. 61/009,147 filed Dec. 24, 2007.

FIELD OF THE INVENTION

The present invention relates to methods and apparatus of providing image data of to support a valuation of loan collateral. More specifically, the present invention relates to methods and apparatus for more efficiently providing image data descriptive of the subject real estate property to support a valuation of the subject property.

BACKGROUND OF THE INVENTION

The real estate marketplace includes times of significant sales and refinancing and times of significant mortgage foreclosures. Each can, at times require an accurate estimation of a current value of a property.

Some instance may include a scenario where a borrower has improved a property and would like to additionally leverage the improved value of the improved property. In such cases, the borrower will typically wish to secure the additional monies as quickly as possible.

In other instances a property owner may be either unable to pay a mortgage due or decide not to pay on the mortgage note. Such situations generally position both the lender and the borrower in a deleterious position. The lender is faced with the unprofitable task of foreclosing on the property and then selling it at auction, which generally results in a financial loss to write off. The borrower faces the impact of being associated with a foreclosure on the property, which amongst other things, may negatively impact their credit rating.

One possible way to avoid the negative effects to both the borrower and the lender is to find a buyer to purchase the property prior to foreclosure. Such distressed properties are often in a state of disrepair and require a buyer willing to assume a "fixer up" project. If a transaction can be arranged, the buyer is provided with an opportunity to repair and improve the property and hopefully generate a profit for their effort. However, few buyers willing to assume this type of effort have the financial means to fund the purchase of the property and the distressed state of the property often results in an appraisal value which is not high enough to secure traditional purchase money financing, no less finance the needed repairs.

The majority of real estate mortgages are structured to support the purchase of a property based upon the inherent value of the property at a time of mortgage initiation. A small percentage of real estate mortgages are structured to support acquisition a real estate property and improvement of a property. Such distressed property loans consider the value of the property in the improved state based upon the proposition that the improvement imparts additional value to a property. They are generally associated with higher risk and left largely un-served by traditional financial institutions. As a result, interest rates for such loans may be double, or more, than the interest rate for a traditional mortgage and also include substantial points. Such rates are sustainable because the loans are often short term and the potential profit on the property resale absorbs the points.

Despite the potential profit from making loans on distressed properties, traditional banks and mortgage companies generally due not originate them because they do not fit their traditional product structures. The underlying collateral pre-restoration is not readily marketable on a retail basis and in come cases may be uninhabitable in a condition at closing. In addition, secondary markets do not exist for commercial-type mortgages on unoccupied residential properties, which means that these loans cannot be packaged and sold in the capital markets. In addition, traditional mortgage operations are not designed for rapid closings and payments of small construction draws which are generally required to address the circumstances associated with distressed properties.

The result of the unique conditions associated with distressed properties is a marketplace which remains highly fragmented and uncertain. Lenders for such loans are usually associated with a wealthy individual and work with a small number of known borrowers with a proven track record. This can make it difficult for an entrepreneurial minded person to break into this marketplace. In addition, an owner of a distressed property is faced with few, if any options for sale of their property.

SUMMARY OF THE INVENTION

Accordingly, the present invention provides methods and apparatus for supporting the administration of one or both of acquisition loans and improvement loans related to real property with image data captured of the subject property and used to verify a current state of the property. Generally, the present invention utilizes image data automatically correlated with a location to facilitate the verification of a property value and base a decision on a financial transaction utilizing the image data.

Although the concepts discussed herein are generally discussed in regards to mortgage backed assets and equity loans, other types of assets may also be used to collateralize the security and should be considered within the scope of the invention.

BRIEF DESCRIPTION OF THE DRAWINGS

As presented herein, various embodiments of the present invention will be described, followed by some specific examples of various components that can be utilized to implement the embodiments. The following drawings facilitate the description of some embodiments.

DETAILED DESCRIPTION OF PREFERRED EMBODIMENTS

The present invention provides methods and apparatus financial aspect of the acquisition and improvement market. Acquisition and improvement loans are provided and supported on an efficient basis through the use of unique technology and processes.

Overview

According to the present invention, A&I Loans are systematically made on distressed properties in amounts equal to 100% or more of an acquisition price for the property. Generally, the acquisition price denotes an amount of value provided in exchange for a change of ownership from an owner of a distressed property to a property investor. Disbursements of some funds will be contingent upon completion of predetermined improvements to the property.

In addition, CMBS will be generated based upon the acquisition and improvement loans and brought to the capital markets thereby providing funds to originate acquisition and improvement loans and also provide an excellent security investment to the capital markets.

In another aspect, automated methods and apparatus facilitate auditing of improvements to a property and correlating the release of funds according to a schedule of improvements made to a mortgaged property and confirmed via the audit. One or more agreed upon conditions can be specified in the schedule, wherein each set of conditions precedes a release of a predetermined amount of funds. The audit function verifies that the conditions have been met and that the predetermined amount of funds should be released.

Unlike previous audits involving a live inspection of a real estate property to ascertain compliance with a set of conditions precedent to a release of funds, the present invention includes an audit based upon a compilation of digital evidence that supports a claim of fulfillment of specified conditions. The digital evidence can include, for example, digital images showing completed improvements to a subject property. In some embodiments, the digital evidence can also include geospatial data indicating a location at which the digital images were generated and a time and date stamp indicating when the digital images were generated.

An approval for release of a next installment of funds can be based upon the outcome of the digital evidence based audit.

A request for fund disbursement can be transmitted electronically to a lender representative or a third party authorized to conduct the audit (hereinafter "lender auditor"). In addition, the digital evidence can also be transmitted to the lender auditor to support the request for loan disbursement. If the lender auditor representative determines that the evidence supports a claim of meeting conditions preceding a release of funds, the lender can electronically release the funds. Release of funds can include, for example, electronic disbursement of funds to an account or issuance of a check.

In some embodiments, the entire process according to the present invention can be accomplished at the speed of the automation, with funds being disbursed in time frames much faster than manual processes, following submission of a request for funds and supporting evidence.

DEFINITIONS

"A&I" as used herein, refers to acquisition and improvement and is generally related to acquisition and improvement loans.

"A&I Loan" as used herein, refers to a loan type structured to support the acquisition and improvement of a real estate property.

"ABCP" as used herein refers to an asset backed commercial product.

"CBMS" as used herein, refers to Commercial Mortgage Backed Securities.

"ICHDL" as used herein refers to a financial institution capable of handling distressed loans.

"DIS" as used herein refers to an image data service ("IDS"), and generally includes a provider of continuums of image data made up of one or more composites of image data descriptive of a subject property.

"MBS" as used herein, refers to mortgage backed securities.

"REO" as used herein, refers to "real estate owned" by a mortgage lender other than an acquisition and improvement mortgage lender.

Methods

Figure 1:
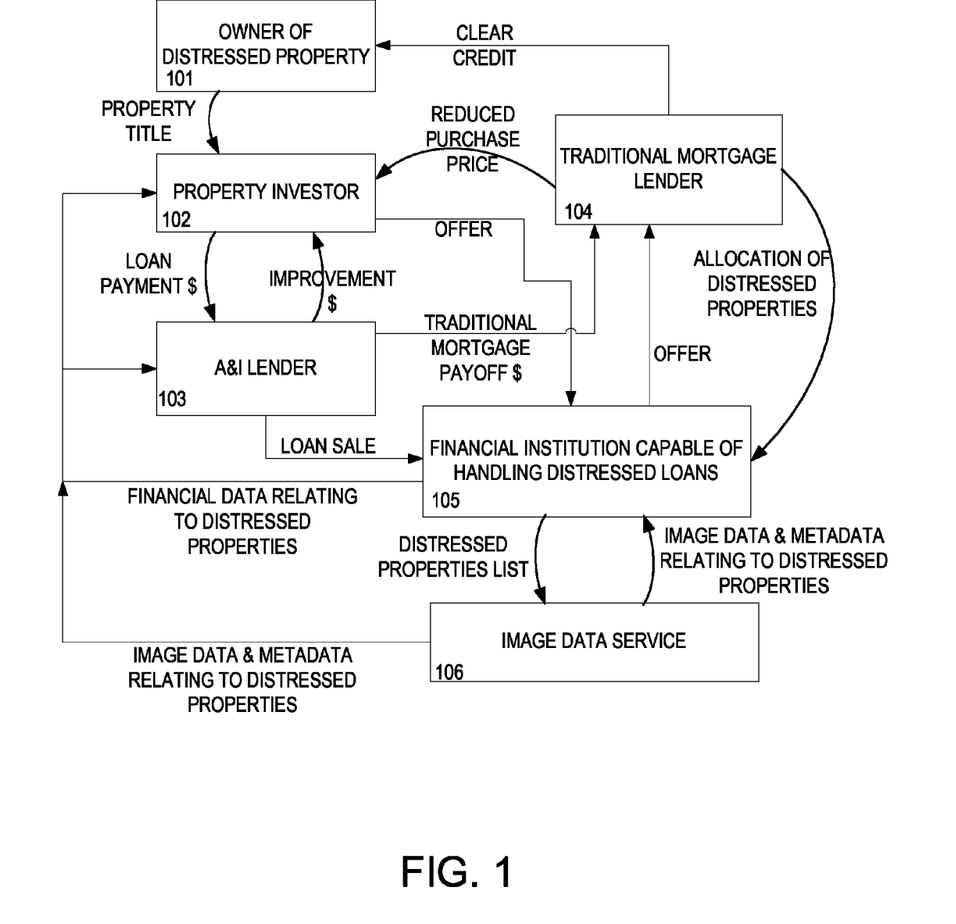
FIG. 1 illustrates a block diagram of components and process steps according to some embodiments of the present invention.

Referring now to FIG. 1, a block diagram illustrates a general flow of funds and process steps associated therewith. According to the present invention, pools of acquisition and improvement loans are secured by first mortgages on real estate. In some embodiments, the acquisition and improvement loans include a loan amount greater than an acquisition amount or price paid for the property used to secure the mortgage.

At 101 the present invention is generally implemented when an owner of property fails to make payment to a holder of a mortgage holder note on the property. The owner then becomes an owner of a distressed property 101, or alternatively the mortgage holder may foreclose and hold title to a REO. Non-payment of a loan on a real estate property occurs for any number of reasons, but typically indicates that the owner is under financial strain. In such instances, the owner of the distressed property 101 is then faced with losing the property and additionally incurring a significant negative impact on the owner's credit history. It may be impossible for the owner of the distressed property 101 to maintain ownership of the property securing the mortgage note, however, according to the present invention, the owner of the distressed property 101 may circumvent the negative impact on the owner's credit history.

Similarly, a bank or other traditional mortgage lender 104 has to deal with a distressed mortgage loan. If the traditional mortgage lender 104 is forced to foreclose on the property, the traditional mortgage lender 104 will face significant costs, including, for example one or more of: loss of loan payments, carrying costs of the property, legal fees, auction fees, real estate sales commissions, p&l insurance costs and title insurance costs. Other monetary costs may also be incurred, as well as reputation and credit rating implications of writing off non-performing loans. It should be understood, that in this context, a traditional mortgage lender is a current owner of the mortgage note and may or may not be the original lender to the owner of the distressed property.

In order to avert the negative implications associated with a distressed mortgage loan, the present invention provides for the allocation of the distressed loan to a financial institution capable of handling distressed loans 105 ("ICHDL"). The ICHDL forwards information descriptive of the property to an image data service 106 ("IDS").

The IDS 106 has computer servers, or other data storage device, storing image data descriptive of the distressed property, as well as areas related to the distressed property. In some embodiments, the stored image data includes image data sets that make up one or more continuums of image data. Some embodiments include image data sets captured at or about street level. Some specific embodiments include two-dimensional continuums of composite image data such as those provided as RibbonView™ a product of VisRe Corporation. Other embodiments can include continuums of three-dimensional models based upon actual image data captured at, or about street level. Street level generally refers to image data set captured within thirty feet of the ground surface.

The IDS provides image data to the ICHDL of the distressed property. In addition, the IDS may provide image data related to the distressed property to one or more of an acquisition and improvement lender 103 and a property investor 102. The image data provided can include, for example, composite image data of the distressed property, as well as one or more of: composite image data of a surrounding neighborhood, including image data descriptive of adjacent properties; composite image data facilities related to the distressed property, such as schools or recreational facilities; industrial sites in proximity to the distressed property, or other geographic locations related to the distressed property.

The IDS may also provide metadata descriptive of a distressed property or areas related to the property. Metadata may include, by way of example: data related to the distressed property, statistical data related to the neighborhood of the distressed property, values of comparable properties to the distressed property; municipality data; school district data; demographic data, or any other data related to the distressed property.

It should apparent that the route of dissemination of the image data and the financial data related to the distressed property is not limited to any one chain of entities or to any particular medium of dissemination. Therefore, for example, such information may be specifically sent to a recipient, such as, for example, via electronic mail, or made available on a website or other network address or uniform resource locator. In addition, an acquisition and improvement lender 103 may first receive data related to a distressed property and further disseminate it to one or more property investors 192 or a property investor 102 may approach one or more acquisition and improvement lender 103 with the information. Other scenarios are also within the scope of the invention, such as, for example, an owner 101 of a distressed property providing information to a property investor 102 or an acquisition and improvement lender 103. The invention should only be limited therefore by the scope of the following claims.

In some embodiments, a property investor 102 may review the information provided and make an offer for the distressed property. In some embodiments (as illustrated) an offer is presented to the ICHDL 105. The ICHDL 105 may also receive other offers from other property investors and present the highest offer to the traditional mortgage lender 104. In the event that the highest offer is more than an amount of the outstanding loan obligation on the distressed property, the traditional mortgage lender 104 will accept the offer. In the event that the offer is less than an amount owed on the property, the traditional mortgage lender 104 can still decide to accept the offer in order to avert the negative implications of having to foreclose of the distressed property. In such cases, the property investor 102 is able to purchase the distressed property at a reduced price and the traditional mortgage lender 104 is able to mitigate any financial loss and reputational risk that is associated with a loan foreclosure.

In some embodiments, a property investor 102 negotiates a reduced price directly with the traditional mortgage lender 104. In some embodiments, negotiation is accomplished via electronic communication, wherein a price, as well as time to closing and other details may all be done with the efficiencies of twenty-four hour access and availability of data and bidding exchange.

Following the determination of an accepted purchase price, The property investor 102 can negotiate a mortgage note based upon one or more of: the purchase price of the property; an appraised value of the property; and a estimated value of the property following a schedule of improvements to the property.

Generally, acquisition and improvement mortgage notes will include 100% of the purchase amount of the distressed property. However, it is within the scope of the invention for other amounts, such as preferably within 90% to 110% of the purchase amount to be included in a first loan amount made with the distressed property as collateral.

In those cases where a mortgage loan amount is based upon the value of a property following completion of a scheduled list of improvements, a purchase money mortgage can be executed with some portion of the mortgage amount held back from the borrower (i.e. the property investor 102) until some, or all, of the improvements are completed. Installments of funds can be made available to the property investor 102 according to electronic verification of a completed improvement milestone.

Upon closing of the acquisition and improvement loan for the distressed property, the traditional mortgage lender 104 will receive the negotiated amount for the sale of the distressed property. The property investor 102 receives title to the distressed property and the acquisition and improvement lender 103 receives loan payments.

It is understood that loan payments can include any monies that the acquisition and improvement receives as a result of closing the acquisition and improvement loan. Accordingly, loan payments can include, for example, one or more of: closing points, fees, expediting premiums, commissions, installment payments and balloon payments. Installment payments can be interest only or interest and an amortized payment.

The nature of an acquisition and improvement loan dictates that the duration of loans will typically be 12 months or less. As a result, most acquisition and improvement loans will be structured as balloon payments, which are due when the loan is paid off or comes to term, or interest only payments during the term of the loan.

In addition to purchase money, an acquisition and improvement loan will include some amount allocated to improvement of the distressed property. Typically, amounts allocated to improvement of the distressed property are disbursed based upon a schedule of improvement milestones and correlating amounts. For example, a predetermined amount can be allocated for a quantifiable improvement, such as installation of new flooring, or installation of new roofing. Based upon a showing of completion of the quantifiable improvement, the correlating funds can be automatically disbursed, as discussed more fully below.

In another aspect of the present invention, the acquisition and improvement lender 103 can sell closed acquisition and improvement loans to the ICHDL 105, wherein the ICHDL 105 can aggregate multiple acquisition and improvement loans and sell them aggregated loans on the capital markets. Selling the loans to the ICHDL 105 increases capital available to the acquisition and improvement lender and allows the lender to make additional loans, which in turn increases the availability of the owners of distressed property 101 to sell the distressed property and mitigate any negative impact on their credit history and also allow more traditional mortgage lenders 104 to remove troubled loans from their books via a more consistent and systematic process.

Figure 2:
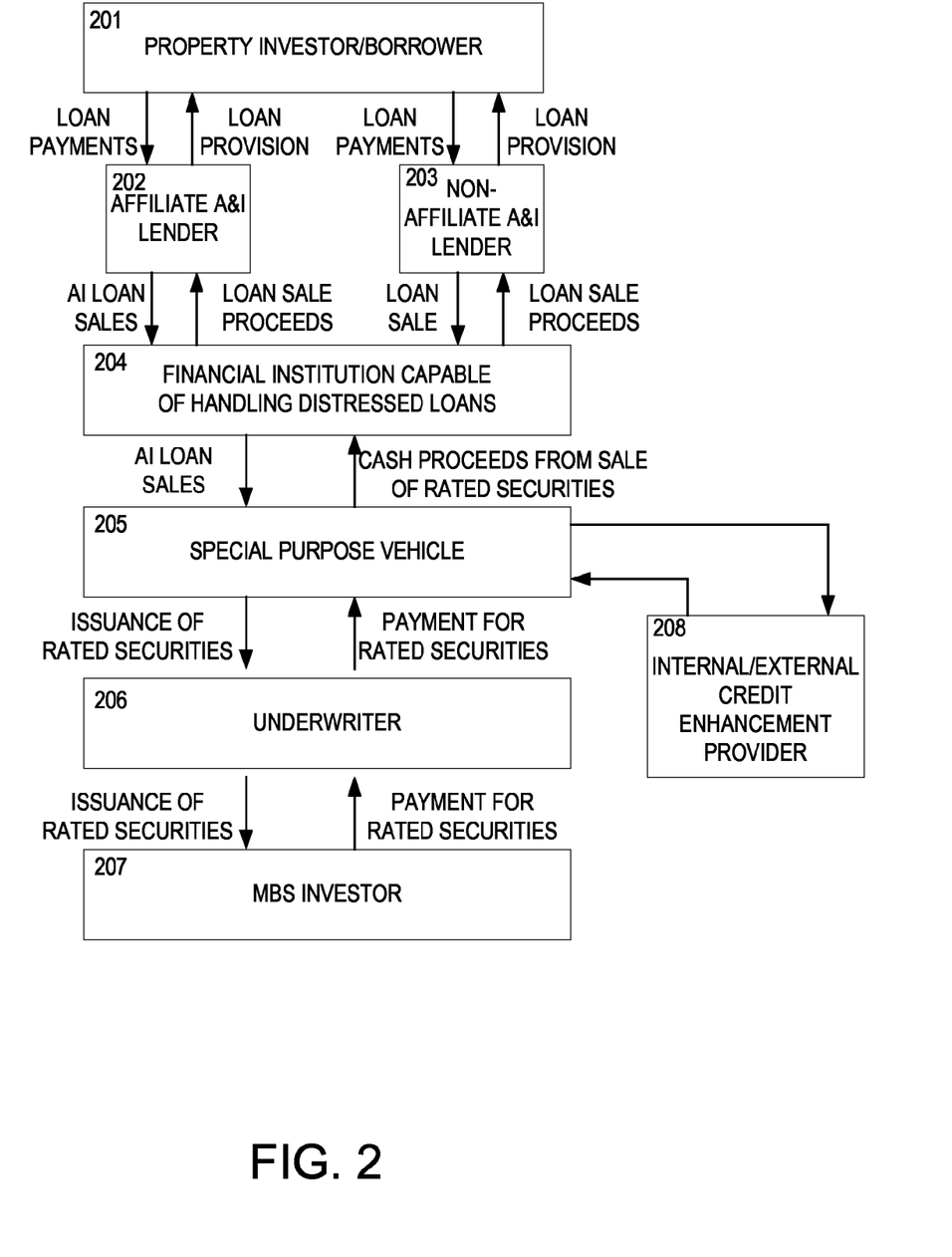
FIG. 2 illustrates a block diagram of additional aspects according to some embodiments of the present invention.

Referring now to FIG. 2, a model is illustrated whereby, according to the present invention, acquisition and improvement loans are made available to a secondary market via mortgage backed securities. The ability of an acquisition and improvement lender 202 to consistently provide acquisition and improvement loans according to the model illustrated by FIG. 1, and thereby facilitate a market for distressed properties, is at least furthered by, if not contingent upon, the ability of the acquisition and improvement lender 202 to access a secondary market for the acquisition and improvement loans originated by the acquisition and improvement lender 202. The methods of the present invention provide a mechanism to provide such access.

As described above, a property investor 210 secures a loan from an acquisition and improvement lender 202-203; the acquisition and improvement lender 202 may be affiliated with an ICHDL 204 or a non-affiliate acquisition and improvement lender 203. The acquisition and improvement lenders 202-203 sell the acquisition and improvement loans to the ICHDL 204. According to the present invention the ICHDL 204 aggregates the loans by allocating the acquisition and improvement loans to a special purpose vehicle (SPV) 205.

The SPV 205 works with an underwriter 206 to issue rated securities to MBS investors 207. The SPV 205 and the underwriter 206 receive proceeds from the sale of the rated securities. The investor 207 has received the opportunity to invest in high yield mortgage backed securities.

In another aspect, the SPV 205 may work with one or more credit enhancement provider 208. The credit enhancement provider may be internal to the SPV 208 or an external entity.

Figure 3:
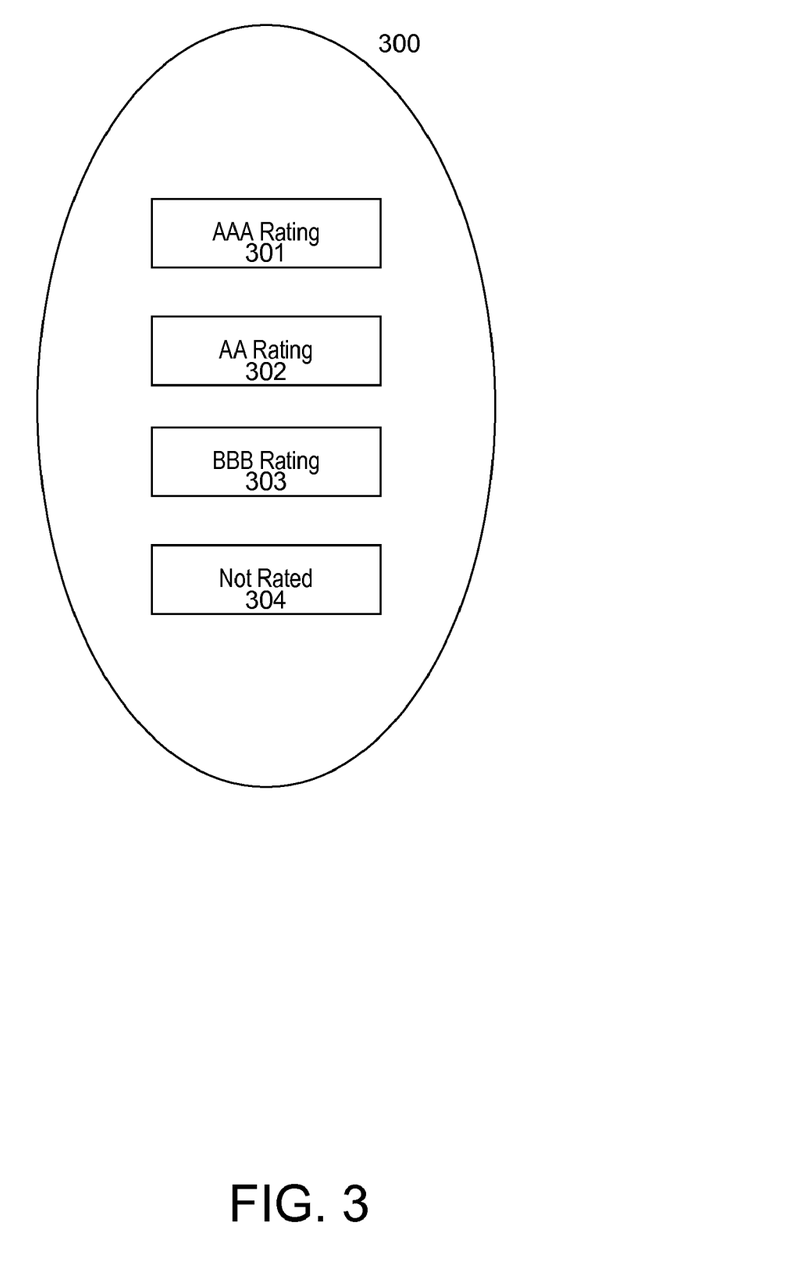
FIG. 3 illustrates a block diagram credit ratings.

Referring now to FIG. 3, one simple method of enhancing the credit rating of the acquisition and improvement loan aggregate 300 is illustrated. The acquisition and improvement loans care individually rated and separated into groups of like rated loans. For example, a majority of the acquisition and improvement loans may be placed in a group of AAA rated loans 301; another placed into a group of AA rated loans 302; another group into a BBB rated group 303; and still another into a Not Rated group 304. In this manner, each portion may be backed by the underwriter and sold with potential compensation requisite to the assigned risk.

Figure 4:
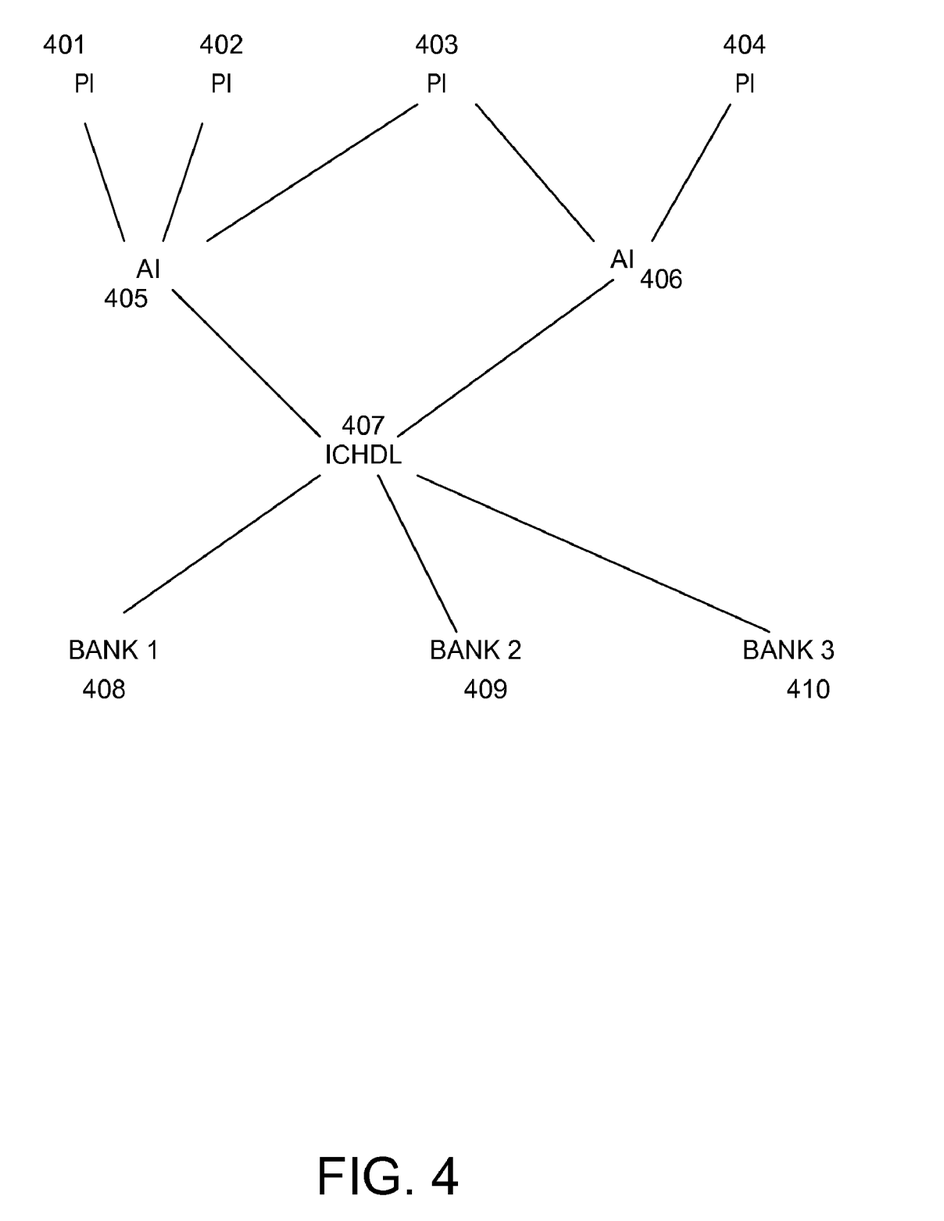
FIG. 4 illustrates a diagram of exemplary entities which utilize image data to implement some embodiments of the present invention.

Referring now to FIG. 4, a relationship between various parties involved is illustrated according to some embodiments of the present invention. An ICHDL 407 interfaces between one or more banks or other traditional mortgage holders 408-410. On a periodic basis, real estate owned (REO) by a bank that has gone through foreclosure, or distressed loans on real estate that face foreclosure, are referred to an ICHDL 407. In some embodiments, the ICHDL agrees to handle all REO by a bank 408-410 and guarantee a bid on all REO by the bank within a predetermined period of time. In some embodiments, exceptions may be carved out, wherein REOs without clear title or with quantified environmental risk are not included in the bidding requirement, but may still be made available to potential bids.

The ICHDL 407 then makes data descriptive of one or both of the REOs and distressed property, available to one or more acquisition and improvement lenders 405-406 and property investors 401-404. The acquisition and improvement lenders 405-406 may also make the data descriptive of the one or both of the REOs and distressed property available to the property investors 410-404. As illustrated, an acquisition and improvement lender 405-406 may work with multiple property investors 401-404 and each property investor 401-404 may work with multiple acquisition and improvement lenders 405-406 to work through the business aspects of each potential acquisition deal for an REO or distressed property.

In some embodiments, the ability to process each REO and distressed loan referred by a traditional mortgage lender is greatly facilitated by the use of technology to expedite decision making involved in the processes described herein. For example, data descriptive of REOs or distressed properties can include a geospatial indicator, such as for example, a street address or a Cartesian coordinate. Continuums of image data can allow any or all of the parties involved to view image data of the subject property. IN addition, in some embodiments, such as RibbonView™ offered by VisRe Inc., continuums of image data can also include image data of a neighborhood in which the subject property is located and image data of comparable properties to the subject property. In some embodiments, metadata on the subject property and related properties can also be made available. Additional embodiments can include continuums of three-dimensional drive by models and three-dimensional walk-about continuums. Any or all of this data made available to a device able to access a distributed network, such as the Internet, greatly facilitates decision making and in some embodiments, can enable decision making without an onsite visit.

Figure 5:
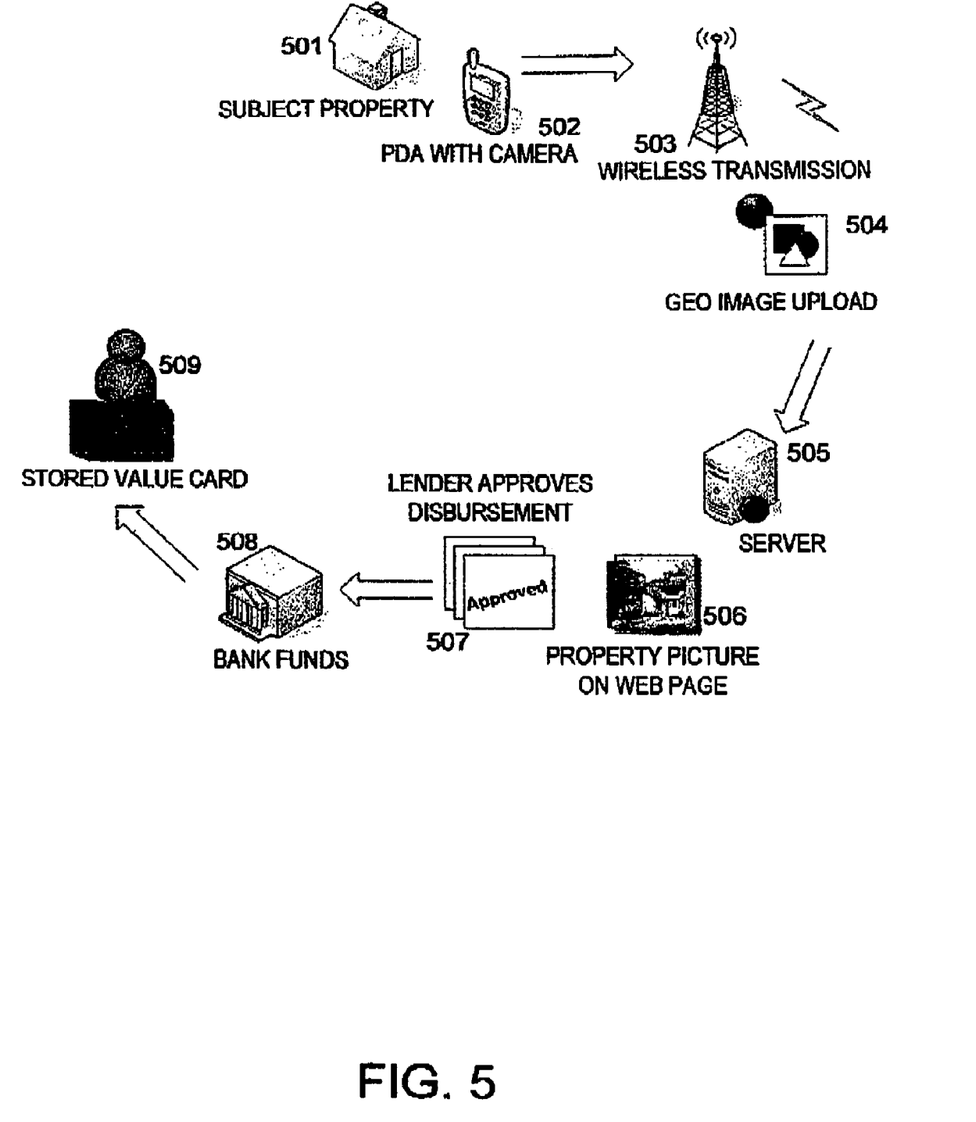
FIG. 5 illustrates a diagram of the flow of image data to facilitate release of funds.

Referring now to FIG. 5, in some embodiments, unique combinations of technologies can also facilitate disbursements of funds allocated as disbursements correlating with improvements to a property with which an acquisition and improvement loan is secured. In particular, some embodiments include disbursement of funds supported by electronic evidence that an improvement to a mortgaged property has been completed. The electronic evidence can circumvent the need for an onsite visit to the property by an agent of the lender in order to certify completion of the improvement.

According to the present invention, electronic image data of the subject property 501 in an improved state can be sent to verify a status of an improvement to the subject property. According to some embodiments, the electronic image data can be acquired by a wireless device, such as a PDA with a camera 502 and sent via wireless transmission 503. In preferred embodiments, the image data can be geo-coded, such as with a latitude and longitude location of the camera at the time of image data capture. In addition, the image data can be time stamped indicating a time that the image data was acquired. Data therefore can quantify when and where the image data was acquired. The geo-coded and time stamped image data can be uploaded 504 to a Server 505. The server can enable viewing of the image data and geo-coded data via a distributed network, such as, for example, a URL on the Internet.

Based upon the geo-coded and time stamped image data, a lender can make a decision to either release bank funds 508 or stipulate some further requirement or evidence, including, in some instances an onsite visit. In a further aspect of the present invention, funds 508 can be electronically released to a stored value card 509. Those skilled in the art will recognize that the processes according to the present invention greatly expedite the processes involved not only in property acquisition, but also in the improvements to the property, since the only delays in releasing funds are those incurred in the automated transfer of data and human interaction with the various interfaces. It is quite feasible therefore for a craftsman to complete an improvement to a property and capture image data of the improvement 502 and transmit the improvement 503 to a website 506 accessible to an acquisition and improvement lender with a request for a release of correlating funds. The acquisition and improvement lender can review the geo-coded image data; process the request for funds and transfer money to a stored value card 509 held by the craftsman, all before the craftsman leaves the jobsite.

In some embodiments, an AI loan can be associated with a schedule of itemized improvements that the borrower agrees to have made to a subject property. Disbursement amounts can be associated with individual improvements or a set of improvements. As the itemized improvements are made to the subject property, instead of an inspector needing to physically travel to a subject property to view the improvements, a borrower can use an image capture device to record one or more pictures, video data or other image data that indicates the completion of the improvement. The image data can be sent electronically to the lender. The lender can review the image data and disburse funds accordingly.

In some embodiments, serialized device can be issued to a borrower wherein the serialized device includes technical specifications suitable to ascertaining that the image data submitted meets criteria agreed to by the lender. In addition, the serialized device can reduce the likelihood of the submission of fraudulent pictures being submitted.

Other aspects which can reduce the likelihood of fraud can include geocoding the image data submitted. Geocoding can include, for example, Cartesian coordinates such as latitude longitude designations, GPS coordinates, national grid coordinates or other designation useful for determining a location of the image data capture. In this manner, a lender has evidence that a borrower is actually located on the site of a subject property and transmitting image data captured on a designated time and date of the subject property. In addition, as described above, the image data capture can be further verified by a serialized number of the image data capture device used to capture the image data.

In still another aspect, in some embodiments, image data transferred to a lender can be incorporated into formalized document requesting funds. The formalized document can include, for example, a warranty by the sender as to the content of the image data and also include an identification of the sender, such as one or more of: an electronic identification token and a legally binding electronic signature. Some embodiments may warrant still additional safeguards, such as, for example, a biological identification of one or more of the image data capture person; the sender of the image data; and the fund requester. A biological identification can include for example, an iris scan or fingerprint or other biometric.

Based upon the receipt of the image data and a request for additional funds, a lender can release a cash value to the borrower. In some preferred embodiments, the image data and documentation requesting funds can be transmitted to a lender via a PDA or cell phone wireless connection. A lender in receipt of the image data and request can then made funds available to a designated cash card; financial account or other destination. In some embodiments, a person representing the lender makes an actual review of the image data submitted and a request for release of additional funds. The person then determines if the image data supports the request for additional funds and controls release of the funds accordingly. In other embodiments, receipt of image data and a request for additional funds can be automated. Automated embodiments may store the submitted request and image data for auditing purposes, and automatically transfer an amount to an account, cash card, supplier card or other value card.

Another aspect can include image data and a request to pay an amount to a third party on behalf of the borrower. For example, a borrower may engage a contractor to provide an improvement to a subject property, such as replacement of a roof. Following the completion of the improvement, a borrower may transmit image data capturing the new roof and also transmit a request to transfer money to an account designated by the contractor. Still further embodiments can include a list of lender preferred or approved contractors that a borrower may engage. Use of a lender approved contractor may allow a contractor to transmit image data to the lender upon completion of designated work. In this manner, a lender can receive information and image data from a trusted party that the improvements have been accomplished. In some embodiments, the preferred contractors may be bonded or otherwise provide some guaranty to the lender.

Some embodiments may include provision for an additional line of credit that may be extended to a borrower with the subject property as collateral. The additional line of credit can include terms that differ from an original A&I Loan. With both an A&I Loan and line of credit available, a borrower can provide have still additional monies available as improvements are made and the lender can receive additional sources of income associated with the provision of the additional loan, such as origination points, interest and servicing fees.

Depending on the content of image data that will be transmitted to a lender, in some embodiments, the image data can include image data captured via a VideoWalkABout or a Video DriveBy.

Apparatus

The teachings of the present invention may be implemented with any apparatus capable of embodying the innovative concepts described herein. Image presentation can be accomplished via any multimedia type interface. Embodiments can therefore generally include one or more of a computer server, a personal computer, a laptop computer, handheld computer, game controller; personal digital assistant (PDA), cellular device, HDTV or other multimedia device with user interactive controls, including, in some embodiments, voice activated interactive controls.

Figure 6:
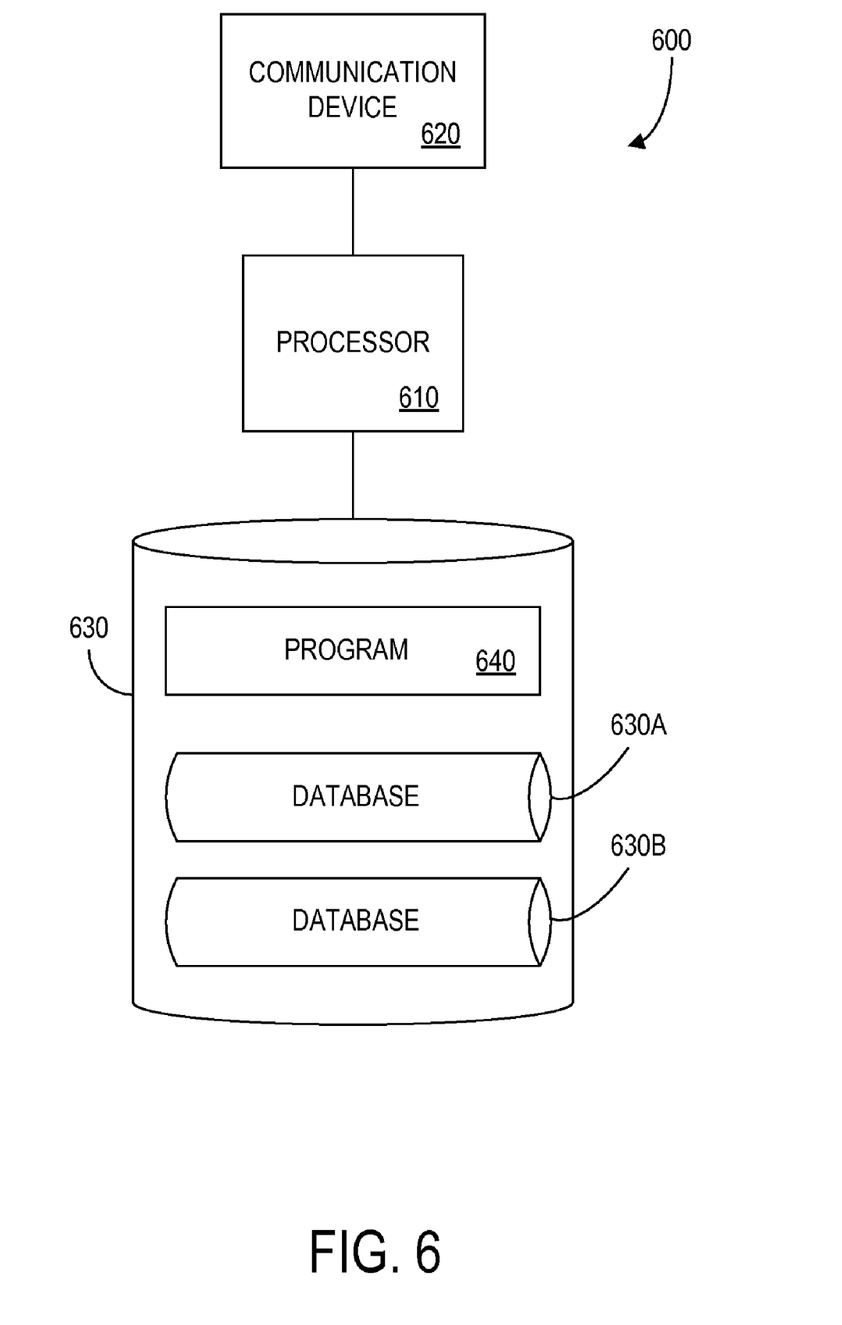
FIG. 6 illustrates apparatus that may be used to implement the present invention.

In addition, FIG. 6 illustrates a controller 600 that may be included in any or all of the above devices and utilized to implement some embodiments of the present invention. The controller 600 comprises a processor unit 610, such as one or more processors, coupled to a communication device 620 configured to communicate via a communication network (not shown in FIG. 6). The communication device 620 may be used to communicate, for example, with one or more online devices, such as a personal computer, laptop or a handheld device.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 640 for controlling the processor 610. The processor 610 performs instructions of the program 640, and thereby operates in accordance with the present invention. The processor 610 may also cause the communication device 620 to transmit information, including, in some instances, control commands to operate apparatus to implement the processes described above. The storage device 630 can additionally store related data in a database 630A and database 630B, as needed.

In some preferred embodiments, image data is collected with apparatus which includes a video and data server farm. The video and data server farm includes at least one video storage server that stores video image files containing video drive-by data that corresponds to a geographic location, a database server that processes a data query received from a user over the Internet that corresponds to a geographic location of interest, and an image server. In operation, the database server identifies video image files stored in the video storage server that correspond to the geographic location of interest contained in the data query, and transfers the video image files over a pre-processing network to the image processing server. The image processing server converts the video drive-by data to post processed video data corresponding to a desired image format, and transfers the post processed video data via post-processing network to the Internet response to the query.

A landing zone server can also be included which receives the video drive-by data from a portable memory device and permits the viewing and analysis of the video drive-by data prior to storage in the video storage server. Still further, a map server is preferably provided to present a static image an overhead view of the geographic location of interest.

Embodiments can also include one or more servers described above included in one or more physical units. Each server does not need to be a disparate apparatus. Still other embodiments can include one or more or the servers described above included in multiple physical units. Some embodiments can even include a single server, as described which includes multiple physical apparatus units at disparate locations.

The invention claimed is:

1. A method for disbursing loan funds, the method comprising the steps of:
   receiving into a computerized device, digital data indicative of a value of a property in a first state and in a second state, wherein the second state comprises a state after completion of one or more specified conditions precedent related to the property, wherein at least the value of the property in the first condition is based upon electronic image data;
   indicating in the computerized device a first loan amount secured by the property and based upon the first value of the property;
   receiving digital image data of a portion of the property associated with completion of one or more of the specified conditions and a geospatial designation of a place of capture of the image, wherein the geospatial designation comprises a latitude and longitude value;
   indicating in the computerized device a schedule of one or more disbursements of funds correlating with the one or more conditions precedent related to the property and receipt of the digital image data quantifying the completion of the one or more specified conditions; and
   recording in the computerized device a disbursement of the first loan amount.

2. The method of claim 1 additionally comprising the steps of receiving the digital image data quantifying completion of at least one of the one or more conditions precedent; and disbursing a second loan amount.

3. The method of claim 2 wherein the one or more conditions precedent comprise improvements to a structure located on the property.

4. The method of claim 3 additionally comprising the step of receiving an electronic request for a disbursement of loan funds, wherein the request includes a description of a condition precedent which that has been met which supports the request for the disbursement of loan funds;
   receiving digital image data in support of the request for the disbursement of loan funds; and
   disbursing funds based upon the request for the disbursement of funds and the digital image.

5. The method of claim 4 wherein the disbursement of funds comprises an electronic transfer of funds into a predetermined financial account.

6. The method of claim 1 additionally comprising the step of providing digital data indicating a date and time during which the digital image data was captured.

7. The method of claim 1 wherein the first loan amount comprises a purchase money mortgage amount for a real estate property.

8. The method of claim 1 wherein the first loan amount is between about 90% and 110% of the purchase amount for the property.

9. A method of ascertaining a value of a subject property, the method comprising the steps of:
   associating the subject property with a geospatial designation;
   receiving image data captured by an image data capture device and descriptive of the subject property;
   receiving digital data descriptive of a geospatial location of the image data capture device at the time of acquisition of the image data, wherein the geospatial location comprises a latitude and longitude value; and
   estimating a value of the subject property based, at least in part, upon the image data descriptive of the subject property and the geospatial location of the image capture device verifying the subject property.

10. The method of claim 9 additionally comprising the step of:
    receiving digital data descriptive of a time and date of acquisition of the image data descriptive of the subject property.

11. The method of claim 10 additionally comprising the step of:
    receiving digital data descriptive of a unique identifier of the image data capture device and determining the image capture device is an authorized for data capture based upon the unique identifier.

12. The method of claim 11 additionally comprising the step of:
    authorizing a financial loan amount based, at least in part, upon the image data received and the digital data descriptive of the time and date of acquisition.

13. The method of claim 9 additionally comprising the step of:
    storing the image data descriptive of the subject property; and
    accessing the digital data descriptive of the subject property in correlation with valuation of a real property other than the subject property.

14. The method of claim 9 wherein the image data comprises composite image data acquired via a VideoDriveBy.

* * * * *

UNITED STATES PATENT AND TRADEMARK OFFICE
CERTIFICATE OF CORRECTION

PATENT NO.       : 8,090,633 B2                                       Page 1 of 1
APPLICATION NO.  : 12/344021
DATED            : January 3, 2012
INVENTOR(S)      : William D. Meadow and Matthew Pavelle It is certified that error appears in the above-identified patent and that said Letters Patent is hereby corrected as shown below:

In the Specification

Column 1, Lines 6-13 should read:

CROSS REFERENCE TO RELATED APPLICATIONS

The present application claims priority to pending patent application S/N 12/135,170, filed, June 6, 2008 and entitled, "Apparatus and Method for Producing Video Drive-By Data Corresponding to a Geographic Location," as a Continuation in Part Patent Application, the contents of which are relied upon and incorporated by reference, and also Provisional Patent Application S/N 61/009,151 ~~and~~ entitled "Methods and Apparatus for Image Based Valuation" filed December 24, 2007, as a Continuation in Part Patent Application, the contents of which are relied upon and incorporated by reference, and also Provisional Patent Application S/N 61/009,181 and entitled "Methods and Apparatus for Real Estate Image Capture" filed December 24, 2007, as a Continuation in Part Patent Application, the contents of which are relied upon and incorporated by reference ~~and also Provisional Patent Application S/N 61/009,147~~.

Signed and Sealed this
Sixth Day of May, 2014

Michelle K. Lee
*Deputy Director of the United States Patent and Trademark Office*